United States Patent
Cheng et al.

(10) Patent No.: US 12,490,323 B2
(45) Date of Patent: *Dec. 2, 2025

(54) UNICAST LINK MANAGEMENT VIA RADIO RESOURCE CONTROL SIGNALING

(71) Applicant: QUALCOMM Incorporated, San Diego, CA (US)

(72) Inventors: Hong Cheng, Basking Ridge, NJ (US); Sudhir Kumar Baghel, Pleasanton, CA (US); Zhibin Wu, Los Altos, CA (US); Kapil Gulati, Belle Mead, NJ (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,301

(22) Filed: Oct. 23, 2023

(65) Prior Publication Data

US 2024/0129970 A1 Apr. 18, 2024

Related U.S. Application Data

(63) Continuation of application No. 17/734,844, filed on May 2, 2022, now Pat. No. 11,832,321, which is a
(Continued)

(51) Int. Cl.
*H04W 76/14* (2018.01)
*H04W 4/40* (2018.01)
(Continued)

(52) U.S. Cl.
CPC ............ *H04W 76/14* (2018.02); *H04W 4/40* (2018.02); *H04W 4/70* (2018.02); *H04W 76/11* (2018.02); *H04W 76/27* (2018.02); *H04W 80/02* (2013.01)

(58) Field of Classification Search
CPC ...... H04W 76/11; H04W 76/14; H04W 76/27; H04W 4/70; H04W 4/40
See application file for complete search history.

(56) References Cited

U.S. PATENT DOCUMENTS

| 11,343,865 B2 * | 5/2022 | Cheng ................. H04W 4/70 |
| 2009/0046667 A1 | 2/2009 | Pelletier et al. |

(Continued)

FOREIGN PATENT DOCUMENTS

| CN | 109155914 A | 1/2019 |
| KR | 20180131411 A | 12/2018 |

(Continued)

OTHER PUBLICATIONS

Bluetooth SIG: "Bluetooth SIG Proprietary Bluetooth Core Specification V 5.0", vol. 3, Part A, Dec. 6, 2016, pp. 1820-1888, XP002783813 (Year: 2016).*

(Continued)

*Primary Examiner* — Siming Liu
(74) *Attorney, Agent, or Firm* — Loza & Loza LLP

(57) ABSTRACT

Aspects relate to managing a device-to-device communication link via radio resource control (RRC) layer signaling. In an example operation, a first wireless communication device establishes a unicast link with a second wireless communication device over a device-to-device communication interface and determines that the unicast link is to be reconfigured with at least one updated parameter. The first wireless communication device then sends a link reconfiguration request to the second wireless communication device via a first RRC message over the communication interface. The first RRC message includes the at least one updated parameter. The first wireless communication device receives a link reconfiguration response from the second wireless communication device via a second RRC message over the communication interface based on the link reconfiguration
(Continued)

request and determines whether to reconfigure the unicast link using the at least one updated parameter based on the received link reconfiguration response.

20 Claims, 9 Drawing Sheets

Related U.S. Application Data continuation of application No. 16/752,525, filed on Jan. 24, 2020, now Pat. No. 11,343,865.

(60) Provisional application No. 62/804,651, filed on Feb. 12, 2019.

(51) Int. Cl.
    *H04W 4/70*         (2018.01)
    *H04W 76/11*       (2018.01)
    *H04W 76/27*       (2018.01)
    *H04W 80/02*       (2009.01)

(56) References Cited

U.S. PATENT DOCUMENTS

| | | |
|---|---|---|
| 2009/0187760 A1 | 7/2009 | Elizarov et al. |
| 2012/0263036 A1* | 10/2012 | Barclay .............. H04L 47/245 370/230 |
| 2014/0025952 A1 | 1/2014 | Marlow et al. |
| 2014/0321272 A1 | 10/2014 | Bangolae et al. |
| 2015/0117292 A1* | 4/2015 | Cho ................. H04W 76/11 370/312 |
| 2017/0171837 A1 | 6/2017 | Chen et al. |
| 2018/0255355 A1* | 9/2018 | Dharmaji ............ H04N 21/472 |
| 2019/0227713 A1* | 7/2019 | Parthasarathy ....... G06F 3/0667 |
| 2020/0107170 A1 | 4/2020 | Chen et al. |
| 2020/0163005 A1* | 5/2020 | Rao .................... H04W 4/44 |
| 2020/0252989 A1* | 8/2020 | Chen .................... H04W 76/19 |
| 2022/0014973 A1* | 1/2022 | Perras .................... H04W 4/46 |
| 2022/0256628 A1 | 8/2022 | Cheng et al. |

FOREIGN PATENT DOCUMENTS

| | | |
|---|---|---|
| WO | 2017047831 A1 | 3/2017 |
| WO | 2017196085 A2 | 11/2017 |

OTHER PUBLICATIONS

Bluetooth SIG: "Bluetooth SIG Proprietary Bluetooth Core Specification V 5.0", vol. 3, Part A, Dec. 6, 2016, pp. 1820-1888, XP002783813, Retrieved from the Internet: URL: https://www.bluetooth.com/specifications/bluetooth-core-specification [retrieved on Aug. 14, 2018].

Chen S., et al., "A Dynamic-Encryption Authentication Scheme for M2M Security in Cyber-Physical Systems", 2013 IEEE Global Communications Conference (GLOBECOM), IEEE, Dec. 9, 2013 (Dec. 9, 2013), pp. 2897-2901, XP032604756, DOI: 10.1109/GLOCOM.2013.6831514, [retrieved on Jun. 11, 2014], Par. II. Figure 1.

Huawei, et al., "Solution: ProSe One-To-One Communication", 3GPP Draft, SA WG2 Meeting #98, S2-132543 ProSe One-To-One Communication-V1.0, 3rd Generation Partnership Project (3GPP), Mobile Competence Centre, 650, Route Des Lucioles, F-06921 Sophia-Antipolis Cedex, France, vol. SA WG2, No. Valencia, Spain, Jul. 15, 2013-Jul. 19, 2013, Jul. 9, 2013 (Jul. 9, 2013), pp. 1-6, XP058725929, the whole document.

International Search Report and Written Opinion—PCT/US2020/015179—ISAEPO—May 13, 2020.

Li Z., et al., "Overview on Initial Metis D2D concept", 1st International Conference on 5G for Ubiquitous Connectivity, ICST, Nov. 26, 2014 (Nov. 26, 2014), pp. 203-208, XP032735035, DOI: 10.4108/ICST.5GU.2814.258096, [retrieved on Feb. 11, 2015], the whole document.

* cited by examiner

UNICAST LINK MANAGEMENT VIA RADIO RESOURCE CONTROL SIGNALING

CROSS-REFERENCE TO RELATED APPLICATIONS

This application is a Continuation Application of U.S. Non-Provisional application Ser. No. 17/734,844, filed on May 2, 2022. Application Ser. No. 17/734,844 is a Continuation Application of U.S. Non-Provisional application Ser. No. 16/752,525, filed on Jan. 24, 2020. Application Ser. No. 16/752,525 claims priority to and the benefit of U.S. Provisional Application Ser. No. 62/804,651, filed on Feb. 12, 2019, the entire contents of which is incorporated herein by reference as if fully set forth below in its entirety and for all applicable purposes.

TECHNICAL FIELD

The technology discussed below relates generally to wireless communication systems, and more particularly, to managing a device-to-device communication link (e.g., new radio (NR) PC5 unicast link) via radio resource control (RRC) layer signaling.

INTRODUCTION

Cellular vehicle-to-everything (V2X) is a vehicular communication system enabling communications between a vehicle and any entity that may affect the vehicle. V2X may incorporate other more specific types of communication, e.g., vehicle-to-infrastructure (V2I), vehicle-to-vehicle (V2V), vehicle-to-pedestrian (V2P), vehicle-to-device (V2D), and vehicle-to-grid (V2G).

In 3GPP Release 14, LTE-based communication has been defined for a direct interface (e.g., PC5 interface) as well as for a network interface (e.g., Uu interface). Currently, V2V communication via the PC5 interface is broadcast. However, for later 3GPP releases (e.g. Release 16 and beyond), there is a need to establish unicast links between vehicles for advanced use cases. A use case for 1-to-1 or 1-to-many V2V link scenarios may involve the on-demand sharing of sensor data that cannot be supported over broadcast. Another use case may involve a see-through camera feed, such as when a first vehicle wishes to see in front of a second vehicle ahead of the first vehicle using the second vehicle's camera.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to managing a device-to-device communication link (e.g., new radio (NR) PC5 unicast link) via radio resource control (RRC) layer signaling. In an example operation, a first wireless communication device establishes a unicast link with a second wireless communication device over a device-to-device communication interface and determines that the unicast link is to be reconfigured with at least one updated parameter. The first wireless communication device then sends a link reconfiguration request to the second wireless communication device via a first RRC message over the device-to-device communication interface. The first RRC message includes the at least one updated parameter. The first wireless communication device receives a link reconfiguration response from the second wireless communication device via a second RRC message over the device-to-device communication interface based on the link reconfiguration request and determines whether to reconfigure the unicast link using the at least one updated parameter based on the received link reconfiguration response. Other aspects and features are also claimed and described.

In one example, a method of wireless communication performed at a first wireless communication device is disclosed. The method includes establishing a unicast link with a second wireless communication device over a device-to-device communication interface, determining that the unicast link is to be reconfigured with at least one updated parameter, sending a link reconfiguration request to the second wireless communication device via a first radio resource control (RRC) message over the device-to-device communication interface, the first RRC message including the at least one updated parameter, receiving a link reconfiguration response from the second wireless communication device via a second RRC message over the device-to-device communication interface based on the link reconfiguration request, and determining whether to reconfigure the unicast link using the at least one updated parameter based on the received link reconfiguration response.

In another example, a first wireless communication device for wireless communication is disclosed. The first wireless communication device includes means for establishing a unicast link with a second wireless communication device over a device-to-device communication interface, means for determining that the unicast link is to be reconfigured with at least one updated parameter, means for sending a link reconfiguration request to the second wireless communication device via a first radio resource control (RRC) message over the device-to-device communication interface, the first RRC message including the at least one updated parameter, means for receiving a link reconfiguration response from the second wireless communication device via a second RRC message over the device-to-device communication interface based on the link reconfiguration request, and means for determining whether to reconfigure the unicast link using the at least one updated parameter based on the received link reconfiguration response.

In a further example, a non-transitory computer-readable medium storing computer-executable code at a first wireless communication device is disclosed. The code causes a computer to establish a unicast link with a second wireless communication device over a device-to-device communication interface, determine that the unicast link is to be reconfigured with at least one updated parameter, send a link reconfiguration request to the second wireless communication device via a first radio resource control (RRC) message over the device-to-device communication interface, the first RRC message including the at least one updated parameter, receive a link reconfiguration response from the second wireless communication device via a second RRC message over the device-to-device communication interface based on the link reconfiguration request, and determine whether to reconfigure the unicast link using the at least one updated parameter based on the received link reconfiguration response.

In yet another example, a first wireless communication device for wireless communication is disclosed. The first wireless communication device includes at least one processor, a transceiver communicatively coupled to the at least one processor, and a memory communicatively coupled to the at least one processor. The at least one processor and the memory are configured to establish a unicast link with a second wireless communication device over a device-to-device communication interface, determine that the unicast link is to be reconfigured with at least one updated parameter, send a link reconfiguration request to the second wireless communication device via a first radio resource control (RRC) message over the device-to-device communication interface, the first RRC message including the at least one updated parameter, receive a link reconfiguration response from the second wireless communication device via a second RRC message over the device-to-device communication interface based on the link reconfiguration request, and determine whether to reconfigure the unicast link using the at least one updated parameter based on the received link reconfiguration response.

In one example, a method of wireless communication performed at a first wireless communication device is disclosed. The method includes establishing a unicast link with a second wireless communication device over a device-to-device communication interface, receiving a link reconfiguration request from the second wireless communication device via a first radio resource control (RRC) message over the device-to-device communication, the link reconfiguration request indicating that the unicast link is to be reconfigured with at least one updated parameter included in the first RRC message, determining whether to reconfigure the unicast link using the at least one updated parameter at a RRC layer of the first wireless communication device, and sending a link reconfiguration response to the second wireless communication device via a second RRC message over the device-to-device communication interface in response to the link reconfiguration request, the link reconfiguration response indicating the determination.

In another example, a first wireless communication device for wireless communication is disclosed. The first wireless communication device includes means for establishing a unicast link with a second wireless communication device over a device-to-device communication interface, means for receiving a link reconfiguration request from the second wireless communication device via a first radio resource control (RRC) message over the device-to-device communication interface, the link reconfiguration request indicating that the unicast link is to be reconfigured with at least one updated parameter included in the first RRC message, means for determining whether to reconfigure the unicast link using the at least one updated parameter at a RRC layer of the first wireless communication device, and means for sending a link reconfiguration response to the second wireless communication device via a second RRC message over the device-to-device communication interface in response to the link reconfiguration request, the link reconfiguration response indicating the determination.

In a further example, a non-transitory computer-readable medium storing computer-executable code at a first wireless communication device is disclosed. The code causes a computer to establish a unicast link with a second wireless communication device over a device-to-device communication interface, receive a link reconfiguration request from the second wireless communication device via a first radio resource control (RRC) message over the device-to-device communication interface, the link reconfiguration request indicating that the unicast link is to be reconfigured with at least one updated parameter included in the first RRC message, determine whether to reconfigure the unicast link using the at least one updated parameter at a RRC layer of the first wireless communication device, and send a link reconfiguration response to the second wireless communication device via a second RRC message over the device-to-device communication interface in response to the link reconfiguration request, the link reconfiguration response indicating the determination.

In yet another example, a first wireless communication device for wireless communication is disclosed. The first wireless communication device includes at least one processor, a transceiver communicatively coupled to the at least one processor, and a memory communicatively coupled to the at least one processor. The at least one processor and the memory configured to establish a unicast link with a second wireless communication device over a device-to-device communication interface, receive a link reconfiguration request from the second wireless communication device via a first radio resource control (RRC) message over the device-to-device communication interface, the link reconfiguration request indicating that the unicast link is to be reconfigured with at least one updated parameter included in the first RRC message, determine whether to reconfigure the unicast link using the at least one updated parameter at a RRC layer of the first wireless communication device, and send a link reconfiguration response to the second wireless communication device via a second RRC message over the device-to-device communication in response to the link reconfiguration request, the link reconfiguration response indicating the determination.

These and other aspects will become more fully understood upon a review of the detailed description, which follows. Other aspects and features of the present disclosure will become apparent to those of ordinary skill in the art, upon reviewing the following description of specific, exemplary aspects in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects are described in this application by illustration to some examples, those skilled in the art will understand that additional implementations and use cases may come about in many different arrangements and scenarios. Aspects described herein may be implemented across many differing platform types, devices, systems, shapes, sizes, packaging arrangements. For example, aspects and/or uses may come about via integrated chip aspects and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or OEM devices or systems incorporating one or more aspects of the described aspects. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes and constitution.

Figure 1:
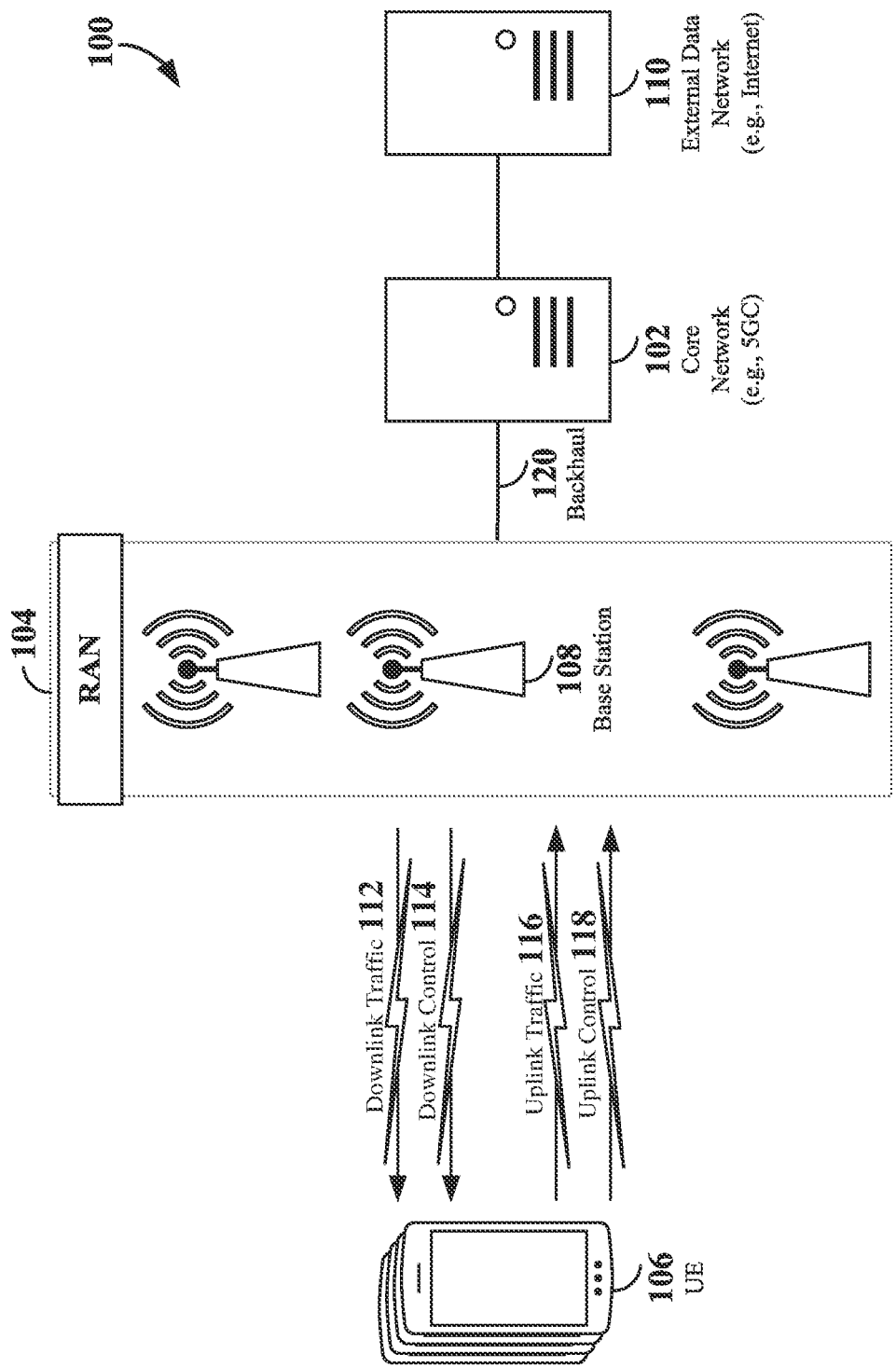
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the base station/scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a base station 108 may broadcast downlink traffic 112 to one or more UEs 106. Broadly, the base station 108 is a node or device responsible for scheduling traffic in a wireless communication network, including the downlink traffic 112 and, in some examples, uplink traffic 116 from one or more UEs 106 to the base station 108. On the other hand, the UE 106 is a node or device that receives downlink control information 114, including but not limited to scheduling information (e.g., a grant), synchronization or timing information, or other control information from another entity in the wireless communication network such as the base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
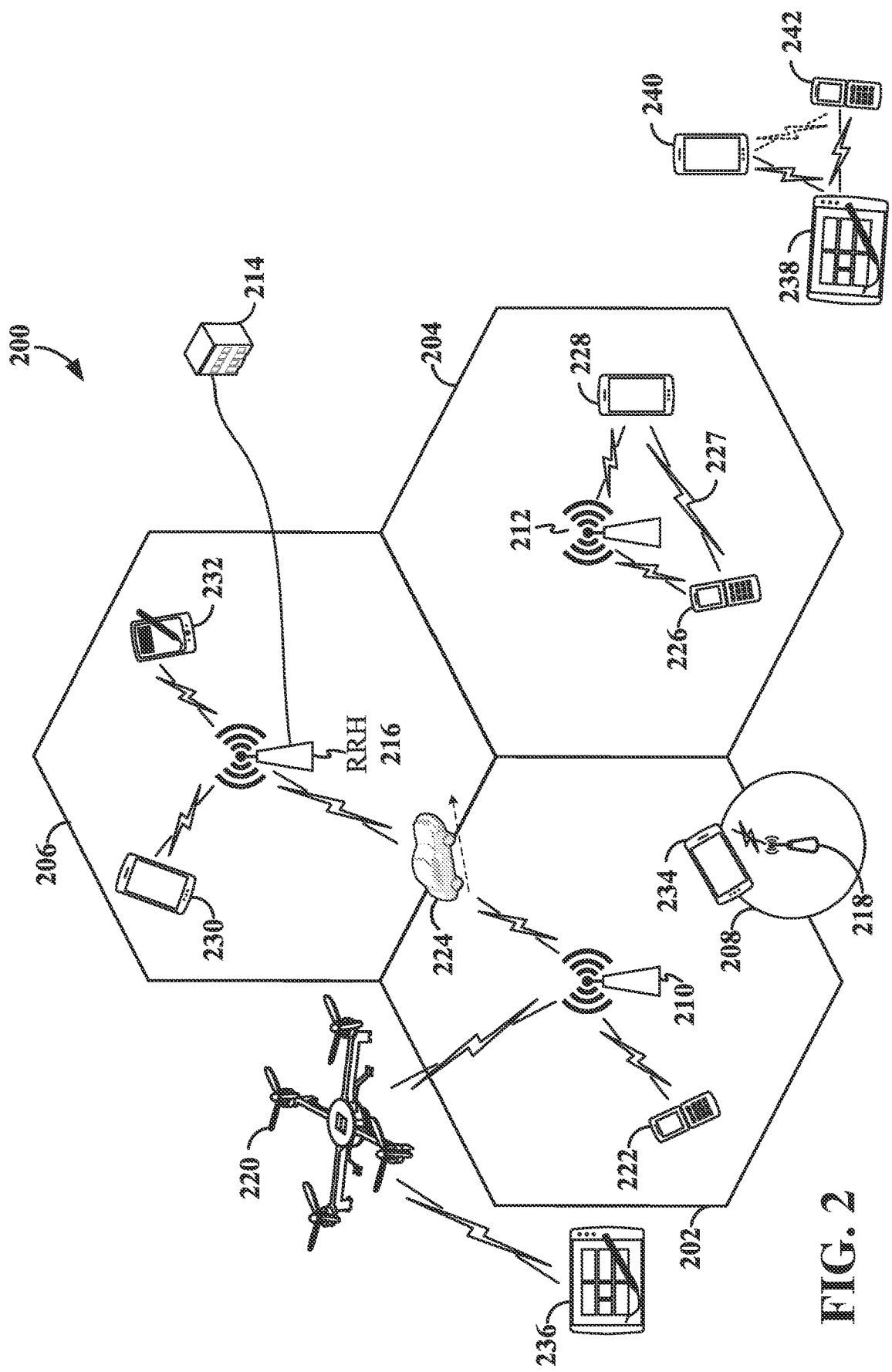
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-everything (V2X) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SS S s) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
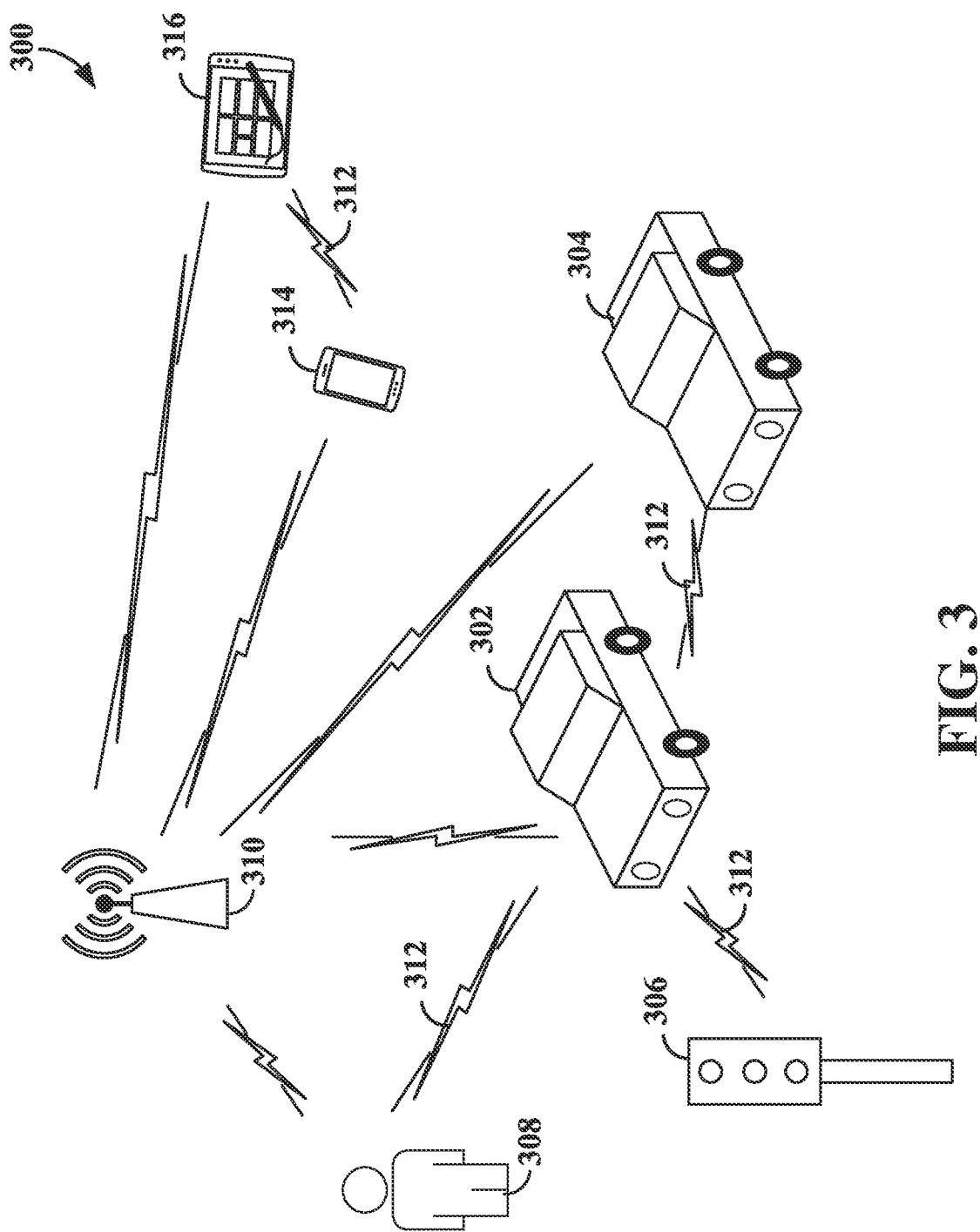
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure 306, such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 15, or other suitable standard.

V2X communication enable vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicles 302 and 304 or between a vehicle 302 or 304 and either infrastructure 306 or a pedestrian 308 occurs over a proximity service (ProSe) PC5 interface 312. In various aspects of the disclosure, the PC5 interface 312 may further be utilized to support D2D communication in other proximity use cases. Examples of other proximity use cases may include public safety or commercial (e.g., entertainment, education, office, medical, and/or interactive) based proximity services. As used herein, the term proximity service (ProSe) communication refers to the direct (e.g., D2D) communication between UEs in proximity use cases other than V2X. In the example shown in FIG. 2, ProSe communication may occur between UEs 314 and 316.

ProSe communication may support different operational scenarios, such as in-coverage, out-of-coverage, and partial coverage. Out-of-coverage refers to a scenario in which UEs 314 and 316 are outside of the coverage area of a base station (e.g., base station 310), but each are still configured for ProSe communication. Partial coverage refers to a scenario in which one of the UEs (e.g., UE 316) is outside of the coverage area of a base station (e.g., base station 310), while the other UE (e.g., UE 314) is in communication with the base station 310. In-coverage refers to a scenario in which UEs 314 and 316 are in communication with the base station 310 (e.g., gNB) via a Uu (e.g., cellular interface) connection to receive ProSe service authorization and provisioning information to support ProSe operations.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time—frequency resources for a given antenna port. That is, in a multiple-input multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time—frequency grid, and contains a single complex value representing data from a physical channel or signal.

Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
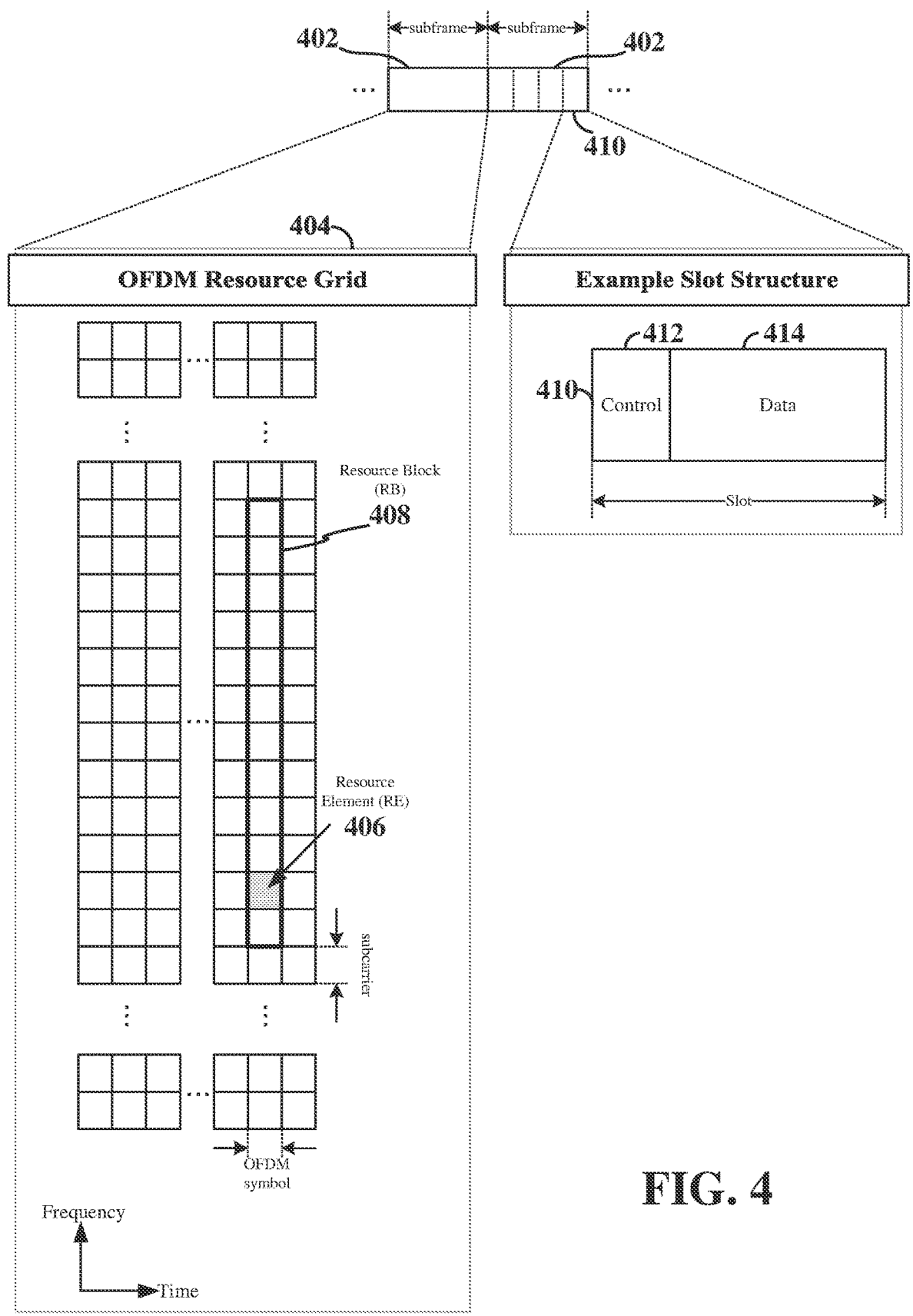
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular (network) carrier via a Uu interface, for a DL transmission, the transmitting device (e.g., the base station 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more UEs 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the UE 106) may utilize one or more REs 406 to carry UL control information 118 originating from higher layers via one or more UL control channels, such as a physical uplink control channel (PUCCH), a physical random access channel (PRACH), etc., to the base station 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the base station 108 to schedule uplink transmissions. Here, in response to the SR transmitted on the control channel 118, the base station 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 414 of the slot 410 may include a physical sidelink shared channel (PSSCH) including the data transmitted by the initiating (transmitting) sidelink device within resources reserved over the sidelink carrier by the transmitting sidelink device.

The channels or carriers described above and illustrated in FIGS. 1 and 4 are not necessarily all the channels or carriers that may be utilized between a base station 108 and UEs 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Aspects of the present disclosure relate to a new radio (NR) PC5 link supporting a unicast connection at a radio resource control (RRC) layer. In 3GPP Release 16, the NR PC5 interface for V2X communications provides unicast support at an Access Stratum (AS) layer. Unicast support at the NR PC5 interface according to 3GPP Release 16 is different from previous 3GPP releases, such as 3GPP Release 13 for D2D/ProSe communication. In 3GPP Release 16, RRC signaling is utilized to establish and manage a Layer 2 (L2) link. Accordingly, the NR PC5 interface may provide true unicast operation at the AS layer, meaning that the lower layer (L2 or AS layer) performs some type of signaling management as well as provide some type of feedback, hence true unicast.

Previously, D2D/ProSe operations under 3GPP Release 13 provided unicast support, however such unicast support is performed by an upper layer. That is, a unicast link is managed by ProSe layer (Layer 3 or L3) signaling over a broadcast AS layer. No control operations are performed at the AS layer (lower layer). Rather, all unicast operations are managed by the upper layer and packets are sent over broadcast media.

In various aspects of the present disclosure, for the NR PC5 interface for V2X communications, the AS layer is involved in managing the unicast link. Moreover, an RRC layer (within the AS layer) may be utilized to establish/manage the unicast link and an RRC context may be created.

According to aspects of the present disclosure, during the lifetime of the unicast link over a D2D interface, there may be a need to change the configuration of the unicast link. Unicast link configuration updates may be necessary and triggered by different reasons. In one example, the link configuration may need to be updated due to V2X privacy requirements. Specifically, there may be a need to change a Layer 2 (L2) identifier (ID) of the link from time to time. For example, the L2 ID (or source layer ID) of the link may need to be changed by the UE (or vehicle) every few minutes to avoid being tracked by a third party.

In another example, the unicast link configuration may need to be changed due to changing radio conditions. For example, UEs (or vehicles) in the unicast link may move closer to or farther away from each other. Accordingly, a radio condition between the UEs may change due to the altered distance between the UEs, and/or the objects in between. Accordingly, a radio layer configuration may need to be updated to maintain a throughput of the unicast link as the UEs (vehicles) move closer or farther away from each other. For example, MIMO settings, a modulation and coding scheme (MCS) number, and/or other radio parameters may be updated.

As described above, the unicast link may be managed/updated during the lifetime of the unicast communication. Moreover, link configuration updates may involve the PC5-RRC layer since the unicast link may be setup using the PC5-RRC layer. Accordingly, what is needed is a new NR PC5 link management/update mechanism for V2X communications that handles link configuration updates/changes at a lower layer, i.e., the link management/update mechanism is managed by the PC5-RRC layer and does not affect an upper (L3) layer.

Figure 5:
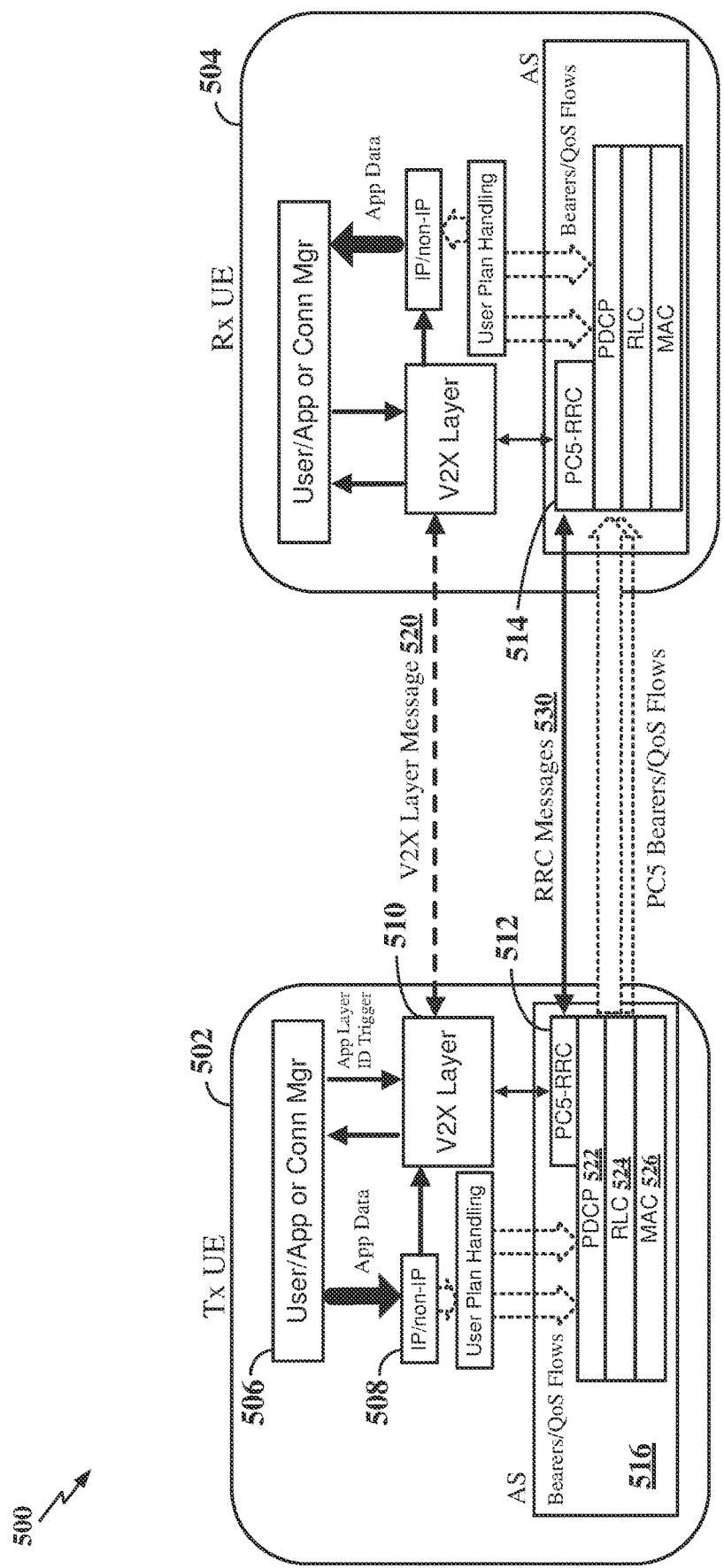
FIG. 5 is an example architecture for cross-layer interactions over a new radio (NR) PC5 interface.

FIG. 5 is an example architecture 500 for cross-layer interactions over a NR PC5 interface. In particular, the architecture 500 provides a high level description of V2X layer-RRC layer interactions between a transmitting UE (Tx UE or first UE) 502 and a receiving UE (Rx UE or second UE) 504 involved in V2X communication. The architecture 500 also describes the protocol stack of each of the UEs and how they interact with each other.

In an example operation, the Tx UE 502 is the UE that initiates a communication with the Rx UE 504. A User/Application (User/App) or Connection Manager (Conn Mgr) 506 at the Tx UE 502 may have data to send to the Rx UE 504. Accordingly, such data is forwarded to an IP/non-IP layer 508 of the Tx UE 502 for further handling.

In an aspect, V2X communication supports IP-based data and non-IP-based data. Depending on the application or the UE, traffic can be of different types (e.g., IP and non-IP). When data/traffic is sent to the IP/non-IP layer 508, this may trigger a V2X layer 510 at the Tx UE 502 to establish a direct communication link with the Rx UE 504. For example, the V2X layer 510 may know that there is a destination for this particular communication using a unicast mode. If the V2X layer 510 detects or decides that there is no existing communication link with the Rx UE 504, then the V2X layer 510 may establish a unicast communication link. This may involve V2X layer 510 messaging between the Tx UE 502 and the Rx UE 504 to establish the link. Link establishment signaling may be transported via a PC5-RRC layer 512, 514. Accordingly, a V2X layer message 520 may be encapsulated in a PC5-RRC message 530 transported via the PC5-RRC layer 512, 514. The V2X layer 510 may also pass additional control point parameters in the PC5-RRC message. The PC5-RRC message may also include additional parameters to help setup the link.

In an aspect, the PC5-RRC message may contain information regarding a configuration of an Access Stratum (AS) layer 516. For example, the PC5-RRC message may include MIMO settings, MCS, and/or other radio parameters. In a further aspect, the PC5-RRC message may be sent over a protocol layer stack including a packet data convergence protocol (PDCP) layer 522, a radio link control (RLC) layer 524, and a medium access control (MAC) layer 526. Upon sending the PC5-RRC message from the Tx UE 502, the Rx UE 504 may receive the PC5-RRC message and handle accordingly.

In a further aspect of the disclosure, a PC5-RRC message 530 may include a Sidelink RRC Reconfiguration (SLRRCReconfig) message for facilitating signaling that supports a link update. In particular, the SLRRCReconfig message may be utilized by the PC5-RRC layer 512 to manage and update a unicast link. The SLRRCReconfig message may be similar to a RRC Reconfiguration message used over a Uu interface (Uu/RRCReconfig). However, the SLRRCReconfig message includes additional elements that are specific to PC5 signaling.

In a Uu/RRCReconfig scheme, the base station is the entity that determines the update to the link. For example, the base station may instruct/inform the UE of which configuration parameter sets to use. However, in PC5 signaling, either the first UE or the second UE can initiate a link update. Therefore, the SLRRCReconfig message may be initiated from either direction (initiated from the first UE or the second UE). Moreover, PC5 signaling allows for negotiation or confirmation between the UEs in order to be involved in a configuration update procedure. In contrast, in the Uu/RRC reconfiguration scheme, the base station unilaterally instructs the UE as to which particular configuration to use.

In an aspect, the SLRRCReconfig message facilitates an update of link level parameters and configurations of the unicast link without affecting a Layer 3 (L3) context at the V2X layer 510. Elements to be updated may include a Layer 2 identifier (L2 ID) and other radio layer (e.g., PDCP layer, RLC layer, and/or MAC layer) configurations (e.g., MIMO, 64QAM→16QAM). An update may occur at the PC5-RRC layer 512 such that the L3 context is maintained and the application layer is not affected. As such, the V2X layer 510 maintains its context without changing or updating a handler, and only a lower layer (PC5-RRC layer 512) context is changed or updated. The L3 layer context may point to an updated RRC layer context.

In general, when changing/updating the L2 ID according to aspects of the present disclosure, the L3 is not made aware of the change. Also, radio layer configuration parameters will not affect the L3 context because any MIMO and/or MCS change will not affect the L3 context. In an aspect, the L2 includes, for example the PC5-RRC layer, the PDCP layer, the RLC layer, and the MAC layer, and the L3 includes, for example, an RRC layer and a Non-Access Stratum (NAS) layer.

In an aspect, the SLRRCReconfig message may include sidelink-specific information elements for the PC5 communication. This may include, for example, quality of service (QoS) configurations or a transmission profile the AS layer will use to configure the communication.

In a further aspect, a receiving UE (Rx) UE 504 receiving the SLRRCReconfig message may send an acknowledgement (ACK) for the SLRRCReconfig message. For example, the receiving UE 504 may send a SLRRCReconfigComplete message back to the transmitting (Tx) UE 502 such that the Tx UE 502 can learn whether the link configuration update is accepted and/or successful. Even if the link configuration update is not accepted/successful, the Rx UE 504 may provide additional information with the ACK to prompt the Tx UE 502 to adjust the update or plan another course of action.

In an aspect, the SLRRCReconfig message may conceal a relationship between a new L2 ID and an old L2 ID for privacy reasons. Privacy requirements may cause the change of the L2 ID. The change of the L2 ID may be executed using SLRRCReconfig message/signaling. In a SLRRCReconfig message, the relationship between the old L2 ID and the new L2 ID is protected such that a third party is unable to sniff the message and determine the relationship. Otherwise, no privacy will be maintained and the third party can continuously track the UE.

In an aspect, a SLRRCReconfig procedure allows either UE of a unicast link (e.g., Tx UE 502 or Rx UE 504) to initiate a link configuration update. As such, the SLRRCReconfig procedure may also handle a race situation where both UEs start a link configuration update process at the same time.

Figure 6:
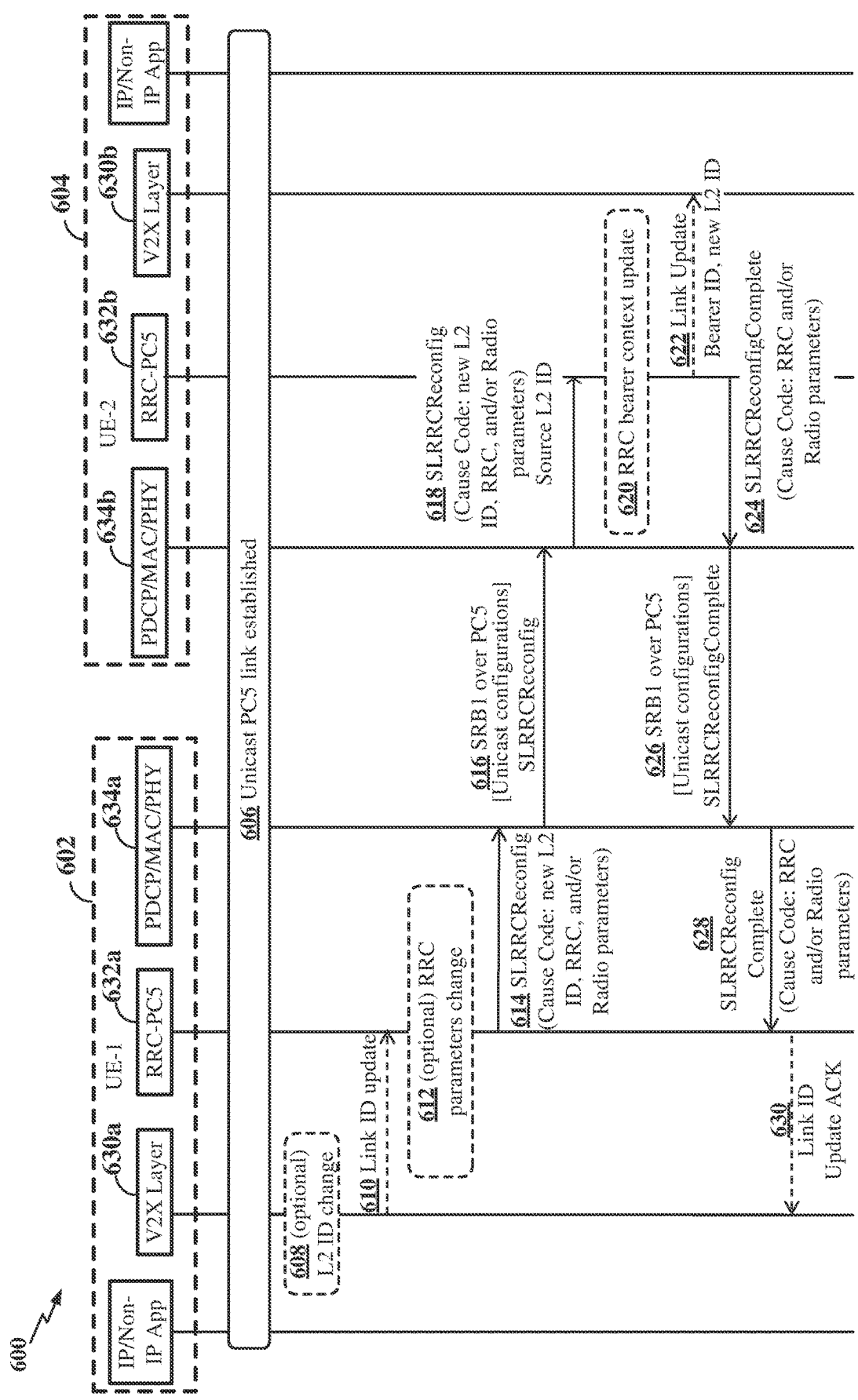
FIG. 6 is an example flow chart describing RRC connection management over a PC5 unicast link.

FIG. 6 is an example flow chart 600 describing RRC connection management over a PC5 unicast link. In particular, the flow chart 600 depicts a unicast link update procedure between a first UE (UE-1) 602 and a second UE (UE-2) 604.

At step 606, a unicast PC5 link is established between the first UE 602 and the second UE 604. At step 608, a situation may occur where the first UE 602 decides that there is a need to change the L2 ID or perform some type of ID update. The update may be triggered by a V2X layer 630a of the first UE 602. In an aspect, the V2X layer 630a may maintain an identifier timer indicating when the ID update is to be performed. In another aspect, an upper layer ID may have changed, e.g., an application layer temporary station ID may have changed, and therefore, the upper layer may trigger the V2X layer 630a to perform the ID update in order to update a lower layer ID (L2 ID) accordingly.

At step 610, if the V2X layer 630a decides that a L2 ID change is required, then the V2X layer 630a may send a trigger (Link ID update) to a RRC-PC5 layer 632a. The L2 ID update trigger may contain a new source L2 ID that is determined by the V2X layer 630a. Alternatively, the L2 ID update trigger may request the RRC-PC5 layer 632a to create the new source L2 ID.

At step 612, the RRC-PC5 layer 632a may optionally make changes to RRC parameters. If so, such operations may trigger SLRRCReconfig signaling without steps 608 and 610. As such, step 612 alone may cause an update procedure without steps 608 and 610.

At step 614, the RRC-PC5 layer 632a may initiate the update using a SLRRCReconfig message. The SLRRCReconfig message may include a cause code indicating the reason that the receiving UE (second UE 604) needs to perform the update. For example, the cause code may indicate a L2 ID update, a RRC parameters update, a radio parameters update, or a V2X layer context update. The SLRRCReconfig message may include a new L2 ID if the update is associated with the L2 ID update. The SLRRCReconfig message may also include RRC layer parameters or radio layer parameters if the update is associated with the RRC parameters update or the radio parameters update.

At step 616, the SLRRCReconfig message may be sent from a PDCP/MAC/PHY layer 634a of the first UE 602 to a PDCP/MAC/PHY layer 634b of the second UE 604 over a signaling radio bearer 1 (SRB1). SRB1 may be used as there is an existing unicast connection between the first UE 602 and the second UE 604. SRB1 is a SRB that has a specific unicast configuration based on the link establishment, e.g., specific MCS, security, or QoS levels. Accordingly, SRB1 may use the unicast configuration to carry the SLRRCReconfig message over the PC5 interface. SRB1 may also have security protection enabled. In an aspect, SRB1 may support the signaling between the first UE 602 and the second 604 as SRB1 may already be customized for the UEs' communication.

At step 618, the receiving UE (second UE 604) may pass the SLRRCReconfig message to the RRC-PC5 layer 632b. In an aspect, when the PDCP/MAC/PHY layer 634b of the second UE 604 receives the SLRRCReconfig message from SRB1, the PDCP/MAC/PHY layer 634b is able to detect, from a PDCP/MAC/PHY layer header, a source L2 ID used by the first UE 602. Such information (source L2 ID used by the first UE 602) may also be passed from the lower layer (PDCP/MAC/PHY layer 634b) to the RRC-PC5 layer 632b.

Accordingly, at step 618, the SLRRCReconfig message may include the new L2 ID and the source L2 ID (source L2 ID passed from the lower layer to the RRC-PC5 layer 632*b*). Hence, the second UE 604 is informed of the new L2 ID and the old L2 ID (source L2 ID). Using this information, the second UE 604 may update the L2 ID configuration for the communication. That is, the second UE 604 may use the new L2 ID to replace the old source L2 ID that is associated with the first UE 602, and therefore, the context for the unicast link is updated (step 620).

At step 620, the RRC-PC5 layer 632*b* of the second UE 604 may perform a RRC bearer context update. The RRC bearer context update may include the L2 ID update, a RRC parameters update, or a radio parameters update.

At step 622, the second UE 604 may perform optional updates to pass the new L2 ID information to the V2X layer 630*b*. In an aspect, the V2X layer 630*b* may use a bearer ID to identify the link between the first UE 602 and the second UE 604. As such, the L2 ID may be stored in the RRC-PC5 layer 632*b* and the V2X layer 630*b* may use the bearer ID to identify the link. Hence, the V2X layer 630*b* does not have to know/understand the L2 ID, rendering step 622 optional. However, in another aspect, the V2X layer 630*b* may be required to know/understand the new L2 ID, e.g., due to management reasons or if the new L2 ID is to be passed to an application layer for further processing/handling. In such a situation, step 622 is to be performed.

At step 624, the second UE 604 may send an acknowledgement (ACK), for example, a SLRRCReconfigComplete message, back to the first UE 602. The SLRRCReconfig-Complete message may include a cause code and additional RRC or radio parameters. In an aspect, the update operation may succeed based on the sending of the SLRRCReconfig message alone. That is, the second UE 604 may agree to perform the link configuration update based on the update parameters provided in the SLRRCReconfig message. In a further aspect, the two UEs may perform some type of negotiation. Therefore, in some instances, the two UEs may need to renegotiate the update parameters and provide a counter offer/proposal via a RRC/radio parameters information element (IE). The L2 ID does not have to be negotiated. However, the radio layer parameters or configurations can be negotiated using the SLRRCReconfigComplete signaling message. A cause code included in the SLRRCReconfig-Complete message allows the second UE 604 to indicate back to the first UE 602 whether the previous configuration parameters were successfully installed and/or if additional updates are required based on new parameters offered by the second UE 604. In an aspect, the second UE 604 may reject the update request from the first UE 602. Accordingly, the second UE 604 may indicate such rejection using the cause code.

At step 626, the SLRRCReconfigComplete message may be passed from the second UE 604 to the first UE 602 over the PC5 interface via SRB1. At step 628, the PDCP/MAC/PHY layer 634*a* of the first UE 602 may pass the received SLRRCReconfigComplete message to the RRC-PC5 layer 632*a* of the first UE 602 to complete the negotiation. If the link configuration update is successful, the first UE 602 may begin using the new configuration. If the update is not successful, the first UE 602 may determine a follow-up action based on the new parameters offered by the second UE 604.

In an aspect, the entire update procedure may be initiated based on an indication generated at the V2X layer 630*a*. If so, at step 630, the RRC-PC5 layer 632*a* may send an acknowledgement (Link ID update ACK) to the V2X layer 630*a* indicating that the link configuration update is complete (successful or unsuccessful).

According to aspects of the present disclosure, to protect privacy, the old L2 ID is associated with the new L2 ID in a secure way without revealing the association to a third party during the SLRRCReconfig procedure. In one example, an entire SLRRCReconfig message may be encrypted using certificates (of the UEs) associated with an upper layer ID. For V2X communication, a UE has security certificates associated with a UE's temporary identity and/or a particular service. Therefore, each UE of the unicast link has security certificates. Moreover, because the unicast link may be negotiated, a UE learns the identity of a peer UE and also learns of the security certificates belonging to the peer UE. As such, an initiating UE (e.g., the first UE 602) can use the security certificates of the second UE 604 to encrypt the SLRRCReconfig message. Symmetric or asymmetric encryption may be used.

In another example, to protect privacy, the first UE 602 and the second UE 604 may create a shared seed (secret) at the time of link establishment so that a new L2 ID information element can be obfuscated with the seed. The shared seed can be updated each time the L2 ID is updated as part of the SLRRCReconfig message. In particular, when the first UE 602 and the second UE 604 establish a link, the UEs may negotiate a seed for security purposes. The UEs may then encrypt or obfuscate the new L2 ID included in the SLRR-CReconfig message using the seed.

According to other aspects of the disclosure, both the first UE 602 and the second UE 604 may initiate the SLRR-CReconfig procedure (different from a Uu/RRC reconfiguration case). Therefore, a race condition between the first UE 602 and the second UE 604 may need to be addressed.

In an aspect, because all V2X UEs may be synchronized (have a common time), e.g., via GPS signal, GNSS signal, or sidelink synchronization signal, the SLRRCReconfig message may carry a timestamp. Accordingly, a Rx UE may know which side (Tx UE or Rx UE) initiated the link configuration update earlier.

If a UE has already initiated the SLRRCReconfig procedure, the UE may compare the timestamp of a received SLRRCReconfig message from another UE to the timestamp of its own SLRRCReconfig message to determine which SLRRCReconfig procedure was initiated earlier. If the UE's own SLRRCReconfig message has the earlier timestamp, the UE may reject the request from the other UE with a cause code (included in the SLRRCReconfigComplete message) to ask the other UE to try again later. The SLRRCReconfigComplete message may include an additional parameter or IE, such as a backoff timer value indicating an amount of time for the other UE to backoff.

If the other UE receives a rejection via the SLRRCReconfigComplete message, the other UE backs off. For example, the other UE may start a timer and wait for the timer to expire before initiating the link configuration update again.

As mentioned above, the UE may include a backoff timer in the SLRRCReconfigComplete message when rejecting the update. The UE may also include a backoff timer in an upper layer message (to the V2X layer) carried within the SLRRCReconfigComplete message if the update was triggered by an upper layer signaling message (V2X layer message). This information informs the V2X layer at the receiving UE to also backoff since the RRC layer is already handling another UE's update procedure. Therefore, not only may the RRC layer backoff, but the V2X layer may also backoff from performing the update procedure, to reduce message generation.

Figure 7:
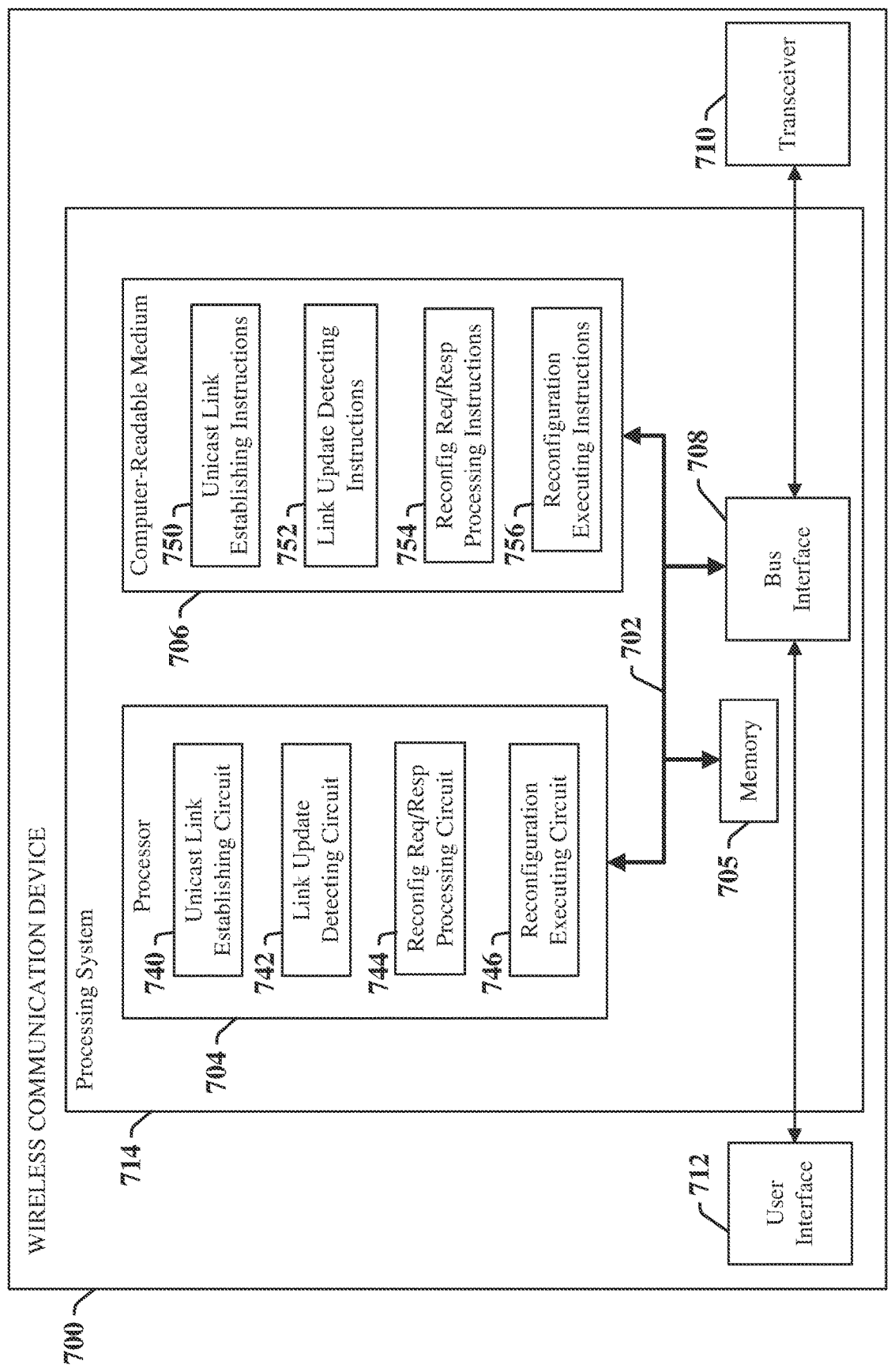
FIG. 7 is a block diagram conceptually illustrating an example of a hardware implementation for a wireless communication device according to some aspects of the disclosure.

FIG. 7 is a block diagram illustrating an example of a hardware implementation for a wireless communication device 700 employing a processing system 714. For example, the wireless communication device 700 may be a user equipment (UE), D2D device, or V2X device as illustrated in any one or more of FIGS. 1-3, 5, and/or 6.

The device 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the device 700 may be configured to perform any one or more of the functions described herein. That is, the processor 704, as utilized in the device 700, may be used to implement any one or more of the processes and procedures described below and illustrated in FIGS. 8 and 9.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided.

In some aspects of the disclosure, the processor 704 may include unicast link establishing circuitry 740 configured for various functions, including, for example, establishing a unicast link with a second wireless communication device over a device-to-device communication interface. For example, the unicast link establishing circuitry 740 may be configured to implement one or more of the functions described below in relation to FIG. 8, including, e.g., block 802 and FIG. 9, including, e.g., block 902. The processor 704 may also include link update detecting circuitry 742 configured for various functions, including, for example, determining that the unicast link is to be reconfigured with at least one updated parameter. For example, the link update detecting circuitry 742 may be configured to implement one or more of the functions described below in relation to FIG. 8, including, e.g., block 804.

The processor 704 may also include reconfiguration request/response circuitry 744 configured for various functions, including, for example, sending a link reconfiguration request to the second wireless communication device via a first radio resource control (RRC) message over the device-to-device communication interface, the first RRC message including the at least one updated parameter, receiving a link reconfiguration response from the second wireless communication device via a second RRC message over the device-to-device communication interface based on the link reconfiguration request, receiving a link reconfiguration request from the second wireless communication device via a first radio resource control (RRC) message over the device-to-device communication interface, the link reconfiguration request indicating that the unicast link is to be reconfigured with at least one updated parameter included in the first RRC message, and sending a link reconfiguration response to the second wireless communication device via a second RRC message over the device-to-device communication interface in response to the link reconfiguration request, the link reconfiguration response indicating a determination of whether to reconfigure the unicast link using the at least one updated parameter at a RRC layer of the first wireless communication device. For example, the reconfiguration request/response circuitry 744 may be configured to implement one or more of the functions described below in relation to FIG. 8, including, e.g., blocks 806 and 808 and FIG. 9, including, e.g., blocks 904 and 908.

The processor 704 may also include reconfiguration executing circuitry 746 configured for various functions, including, for example, determining whether to reconfigure the unicast link using the at least one updated parameter based on the received link reconfiguration response and determining whether to reconfigure the unicast link using the at least one updated parameter at the RRC layer of the first wireless communication device. For example, the reconfiguration executing circuitry 746 may be configured to implement one or more of the functions described below in relation to FIG. 8, including, e.g., block 810 and FIG. 9, including, e.g., block 906.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may include unicast link establishing instructions 750 configured for various functions, including, for example, establishing a unicast link with a second wireless communication device over a device-to-device communication interface. For example, the unicast link establishing instructions 750 may be configured to implement one or more of the functions described below in relation to FIG. 8, including, e.g., block 802 and FIG. 9, including, e.g., block 902. The computer-readable storage medium 706 may also include link update detecting instructions 752 configured for various functions, including, for example, determining that the unicast link is to be reconfigured with at least one updated parameter. For example, the link update detecting instructions 752 may be configured to implement one or more of the functions described below in relation to FIG. 8, including, e.g., block 804.

The computer-readable storage medium 706 may also include reconfiguration request/response instructions 754 configured for various functions, including, for example, sending a link reconfiguration request to the second wireless communication device via a first radio resource control (RRC) message over the device-to-device communication interface, the first RRC message including the at least one updated parameter, receiving a link reconfiguration response from the second wireless communication device via a second RRC message over the device-to-device communication interface based on the link reconfiguration request, receiving a link reconfiguration request from the second wireless communication device via a first radio resource control (RRC) message over the device-to-device communication interface, the link reconfiguration request indicating that the unicast link is to be reconfigured with at least one updated parameter included in the first RRC message, and sending a link reconfiguration response to the second wireless communication device via a second RRC message over the device-to-device communication interface in response to the link reconfiguration request, the link reconfiguration response indicating a determination of whether to reconfigure the unicast link using the at least one updated parameter at a RRC layer of the first wireless communication device. For example, the reconfiguration request/response instructions 754 may be configured to implement one or more of the functions described below in relation to FIG. 8, including, e.g., blocks 806 and 808 and FIG. 9, including, e.g., blocks 904 and 908.

The computer-readable storage medium 706 may also include reconfiguration executing instructions 756 configured for various functions, including, for example, determining whether to reconfigure the unicast link using the at least one updated parameter based on the received link reconfiguration response and determining whether to reconfigure the unicast link using the at least one updated parameter at the RRC layer of the first wireless communication device. For example, the reconfiguration executing instructions 756 may be configured to implement one or more of the functions described below in relation to FIG. 8, including, e.g., block 810 and FIG. 9, including, e.g., block 906.

Figure 8:
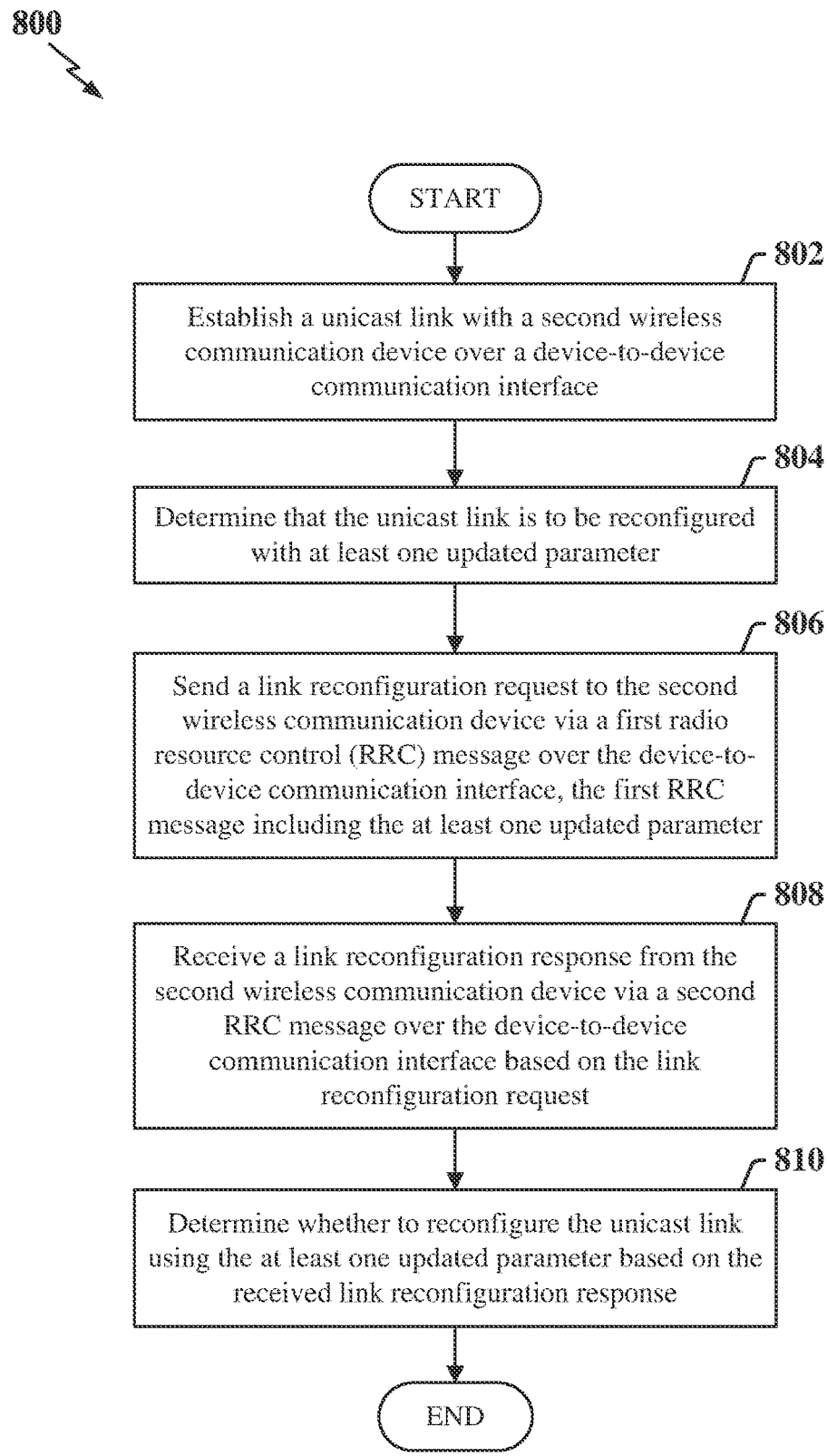
FIG. 8 is a flow chart illustrating an exemplary process for managing a device-to-device communication link via RRC signaling according to some aspects of the disclosure.

FIG. 8 is a flow chart illustrating an exemplary process 800 for managing a device-to-device communication link (e.g., PC5 unicast link) via RRC signaling at a first wireless communication device in accordance with some aspects of the present disclosure. As described below, some or all illustrated features may be omitted in a particular implementation within the scope of the present disclosure, and some illustrated features may not be required for implementation of all aspects. In some examples, the process 800 may be carried out by the device 700 illustrated in FIG. 7. In some examples, the process 800 may be carried out by any suitable apparatus or means for carrying out the functions or algorithm described below.

At block 802, the first wireless communication device establishes a unicast link with a second wireless communication device over a device-to-device communication interface (e.g., PC5 interface).

At block 804, the first wireless communication device determines that the unicast link is to be reconfigured with at least one updated parameter. The at least one updated parameter may include an updated Layer 2 (L2) identifier, an updated RRC layer parameter, or an updated radio layer parameter (e.g., updated PDCP, RLC, and/or MAC layer parameter). In an aspect, the unicast link is determined to be reconfigured based on a RRC layer of the first wireless communication device receiving a L2 identifier update trigger (e.g., step 610 of FIG. 6) sent from a V2X layer of the first wireless communication device. In another aspect, the unicast link is determined to be reconfigured based on a decision at the RRC layer of the first wireless communication device to update the RRC layer parameter or the radio layer parameter (e.g., step 612 of FIG. 6).

At block 806, the first wireless communication device sends a link reconfiguration request to the second wireless communication device via a first radio resource control (RRC) message (e.g., SLRRCReconfig message) over the device-to-device communication interface. The first RRC message may include the at least one updated parameter. The first RRC message may further include a source L2 identifier.

At block 808, the first wireless communication device receives a link reconfiguration response from the second wireless communication device via a second RRC message (e.g., SLRRCReconfigComplete message) over the device-to-device communication interface based on the link reconfiguration request. At block 810, the first wireless communication device determines whether to reconfigure the unicast link using the at least one updated parameter based on the received link reconfiguration response.

In an aspect, the link reconfiguration response may indicate acceptance of the link reconfiguration request by the second wireless communication device. Accordingly, the first wireless communication device may determine to reconfigure the unicast link using the at least one updated parameter. Alternatively, if the link reconfiguration response indicates reasons for rejection of the link reconfiguration request by the second wireless communication device, the first wireless communication device determines to adapt the link reconfiguration request for reconfiguring the unicast link according to the indicated reasons.

For example, when the first wireless communication device determines to adapt the link reconfiguration request, the first wireless communication device may detect, in the link reconfiguration response, at least one further updated parameter provided by the second wireless communication device for reconfiguring the unicast link. Accordingly, the first wireless communication device may send an updated link reconfiguration request to the second wireless communication device based on the at least one further updated parameter and determine to reconfigure the unicast link using the at least one further updated parameter if the second wireless communication device indicates acceptance of the updated link reconfiguration request.

In another example, when the first wireless communication device determines to adapt the link reconfiguration request, the first wireless communication device may postpone reconfiguration of the unicast link until an amount of time has elapsed (e.g., backoff and attempt the link reconfiguration at a later time). In an aspect, the amount of time (e.g., backoff timer) may be specified/indicated in the link reconfiguration response.

In an aspect, when the first wireless communication device sends the link reconfiguration request via the first RRC message, the first wireless communication device may encrypt the first RRC message using security certificates of at least the first wireless communication device or second wireless communication device.

In another aspect, the first wireless communication device may create a shared seed with the second wireless communication device during establishment of the unicast link. Accordingly, when the first wireless communication device sends the link reconfiguration request via the first RRC message, the first wireless communication device may obfuscate the at least one updated parameter included in the first RRC message using the shared seed.

In an aspect, the first wireless communication device may determine whether to reconfigure the unicast link by receiving a second link reconfiguration request from the second wireless communication device and comparing a timestamp of the second link reconfiguration request with a timestamp of the link reconfiguration request sent from the first wireless communication device. Accordingly, the first wireless communication device may accept the second link reconfiguration request from the second wireless communication device and postpone reconfiguration of the unicast link based on the link reconfiguration request sent from the first wireless communication device if the timestamp of the second link reconfiguration request is earlier than the timestamp of the link reconfiguration request sent from the first wireless communication device. Alternatively, the first wireless communication device may reject the second link reconfiguration request from the second wireless communication device if the timestamp of the second link reconfiguration request is later than the timestamp of the link reconfiguration request sent from the first wireless communication device. The accepting or the rejecting of the second link reconfiguration request may include sending a second link reconfiguration response indicating the acceptance or the rejection to the second wireless communication device. In an aspect, the second link reconfiguration response rejecting the second link reconfiguration request may include a backoff timer indicating an amount of time for the second wireless communication device to wait before sending another link reconfiguration request.

In one configuration, the device 700 for wireless communication includes means for establishing a unicast link with a second wireless communication device over a device-to-device communication interface, means for determining that the unicast link is to be reconfigured with at least one updated parameter, means for sending a link reconfiguration request to the second wireless communication device via a first radio resource control (RRC) message over the device-to-device communication interface, the first RRC message including the at least one updated parameter, means for receiving a link reconfiguration response from the second wireless communication device via a second RRC message over the device-to-device communication interface based on the link reconfiguration request, and means for determining whether to reconfigure the unicast link using the at least one updated parameter based on the received link reconfiguration response. In one aspect, the aforementioned means may be the processor(s) 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1-3, 5, and/or 6, and utilizing, for example, the processes and/or algorithms described herein in relation to FIG. 8.

Figure 9:
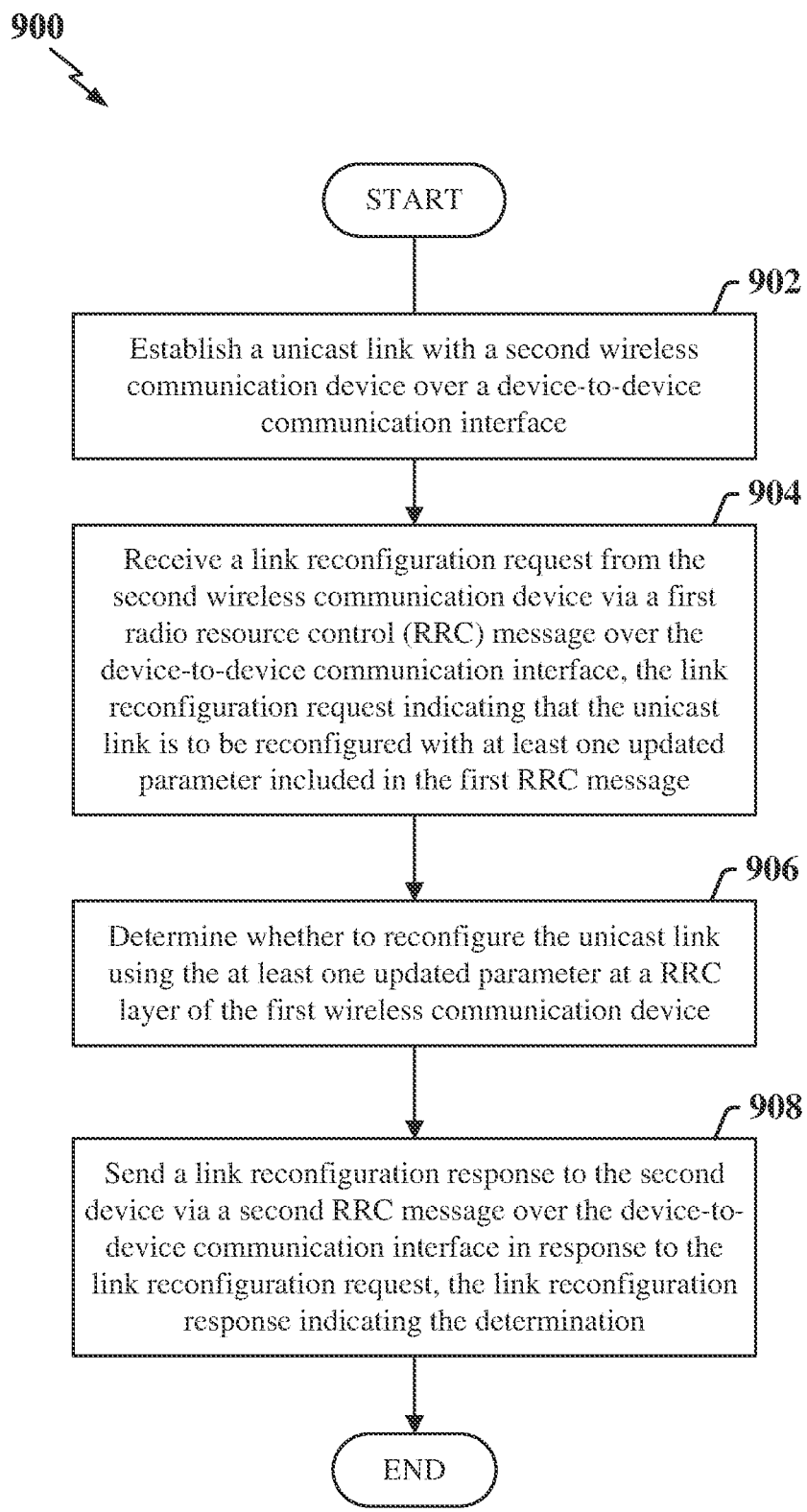
FIG. 9 is a flow chart illustrating another exemplary process for managing a device-to-device communication link via RRC signaling according to some aspects of the disclosure.

FIG. 9 is a flow chart illustrating an exemplary process 900 for managing a device-to-device communication link (e.g., PC5 unicast link) via RRC signaling at a first wireless communication device in accordance with some aspects of the present disclosure. As described below, some or all illustrated features may be omitted in a particular implementation within the scope of the present disclosure, and some illustrated features may not be required for implementation of all aspects. In some examples, the process 900 may be carried out by the device 700 illustrated in FIG. 7. In some examples, the process 900 may be carried out by any suitable apparatus or means for carrying out the functions or algorithm described below.

At block 902, the first wireless communication device establishes a unicast link with a second wireless communication device over a device-to-device communication interface (e.g., PC5 interface).

At block 904, the first wireless communication device receives a link reconfiguration request from the second wireless communication device via a first radio resource control (RRC) message (e.g., SLRRCReconfig message) over the device-to-device communication interface. The link reconfiguration request indicates that the unicast link is to be reconfigured with at least one updated parameter included in the first RRC message. The at least one updated parameter may include an updated Layer 2 (L2) identifier, an updated RRC layer parameter, and/or an updated radio layer parameter (e.g., updated PDCP, RLC, and/or MAC layer parameter. The first RRC message may further include a source L2 identifier.

At block 906, the first wireless communication device determines whether to reconfigure the unicast link using the at least one updated parameter at the RRC layer of the first wireless communication device. When determining whether to reconfigure the unicast link, the first wireless communication device may also perform an RRC bearer context update or forward the updated L2 identifier to a V2X layer of the first wireless communication device.

At block 908, the first wireless communication device sends a link reconfiguration response to the second wireless communication device via a second RRC message (e.g., SLRRCReconfigComplete message) over the device-to-device communication interface in response to the link reconfiguration request. The link reconfiguration response indicates the determination at block 906.

In an aspect, when the first wireless communication device sends the link reconfiguration response to the second wireless communication device, the first wireless communication device may include at least one further updated parameter for reconfiguring the unicast link. Accordingly when the first wireless communication device determines whether to reconfigure the unicast link, the first wireless communication device may receive an updated link reconfiguration request from the second wireless communication device over the device-to-device communication interface based on the at least one further updated parameter and may determine to reconfigure the unicast link based on the updated link reconfiguration request using the at least one further updated parameter.

In an aspect, the first RRC message is encrypted using security certificates of at least the first wireless communication device or second wireless communication device. In a further aspect, the first wireless communication device may create a shared seed with the second wireless communication device during establishment of the unicast link. Accordingly, the at least one updated parameter may be obfuscated in the first RRC message using the shared seed.

In an aspect the first wireless communication device may determine whether to reconfigure the unicast link by sending a second link reconfiguration request to the second wireless communication device and comparing a timestamp of the second link reconfiguration request with a timestamp of the link reconfiguration request received from the first wireless communication device. The first wireless communication device may accept the link reconfiguration request received from the second wireless communication device and postpone reconfiguration of the unicast link based on the second link reconfiguration request sent from the first wireless communication device if the timestamp of the link reconfiguration request is earlier than the timestamp of the second link reconfiguration request sent from the first wireless communication device. Alternatively, the first wireless communication device may reject the link reconfiguration request received from the second wireless communication device if the timestamp of the link reconfiguration request is later than the timestamp of the second link reconfiguration request sent from the first wireless communication device. The accepting or the rejecting of the link reconfiguration request includes sending a link reconfiguration response indicating the acceptance or the rejection to the second wireless communication device. In an aspect, the link reconfiguration response rejecting the link reconfiguration request includes a backoff timer indicating an amount of time for the second wireless communication device to wait before sending another link reconfiguration request.

In one configuration, the device 700 for wireless communication includes means for establishing a unicast link with a second wireless communication device over a device-to-device communication interface, means for receiving a link reconfiguration request from the second wireless communication device via a first radio resource control (RRC) message over the device-to-device communication interface, the link reconfiguration request indicating that the unicast link is to be reconfigured with at least one updated parameter included in the first RRC message, means for determining whether to reconfigure the unicast link using the at least one updated parameter at a RRC layer of the first wireless communication device, and means for sending a link reconfiguration response to the second wireless communication device via a second RRC message over the device-to-device communication interface in response to the link reconfiguration request, the link reconfiguration response indicating the determination. In one aspect, the aforementioned means may be the processor(s) 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1-3, 5, and/or 6, and utilizing, for example, the processes and/or algorithms described herein in relation to FIG. 9.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication performed at a first wireless communication device, comprising:
   establishing a unicast link with a second wireless communication device by a V2X layer via a V2X layer message and a first PC5-Radio Resource Control (PC5-RRC) message transported via a PC5-RRC layer at Layer 2, while maintaining an upper layer context at the V2X layer; and
   sending a first unicast link reconfiguration request, via a second PC5-RRC message transported via the PC5-RRC layer at Layer 2, to the second wireless communication device while maintaining the upper layer context at the V2X layer, the second PC5-RRC message including a first update to a sidelink-specific information element to reconfigure the unicast link.

2. The method of claim 1, further comprising:
   receiving, from the second wireless communication device, a response to the second PC5-RRC message, the response indicating an acceptance of the first unicast link reconfiguration request by the second wireless communication device; and
   reconfiguring the unicast link with the first update to the sidelink-specific information element.

3. The method of claim 1, further comprising:
   receiving, from the second wireless communication device, a response to the second PC5-RRC message indicating reasons for rejection of the first unicast link reconfiguration request by the second wireless communication device; and
   adapting the first unicast link reconfiguration request to reconfigure the unicast link according to the indicated reasons.

4. The method of claim 1, further comprising:
   receiving, from the second wireless communication device, a first response to the second PC5-RRC message including a second update to the sidelink-specific information element to reconfigure the unicast link, the second update to the sidelink-specific information element different from the first update to the sidelink-specific information element;
   sending, to the second wireless communication device, a second unicast link reconfiguration request including the second update to the sidelink-specific information element;
   receiving, from the second wireless communication device, a second response indicating an acceptance of the second unicast link reconfiguration request; and
   reconfiguring the unicast link with the second update to the sidelink-specific information element in response to receiving the second response.

5. The method of claim 1, further comprising:
   receiving, from the second wireless communication device, a response to the second PC5-RRC message including reasons of rejection of the first unicast link reconfiguration request and a backoff timer indicating an amount of time; and
   postponing adapting a second unicast link reconfiguration request according to the reasons of rejection until the amount of time has elapsed.

6. The method of claim 1 further comprising:
   receiving a second unicast link reconfiguration request from the second wireless communication device; and
   comparing a first timestamp of the first unicast link reconfiguration request with a second timestamp of the second unicast link reconfiguration request.

7. The method of claim 6, further comprising:
   accepting the second unicast link reconfiguration request from the second wireless communication device and postponing reconfiguration of the unicast link based on the first unicast link reconfiguration request sent from the first wireless communication device in response to the second timestamp being earlier than the first timestamp; or
   rejecting the second unicast link reconfiguration request from the second wireless communication device in response to the second timestamp being later than the first timestamp.

8. A first wireless communication device in a wireless communication network, comprising:
   one or more wireless transceivers;
   one or more memories; and
   one or more processors communicatively coupled to the one or more wireless transceivers and the one or more memories, wherein the one or more processors are configured to:
      establish a unicast link with a second wireless communication device by a V2X layer via a V2X layer message and a first PC5-Radio Resource Control (PC5-RRC) message transported via a PC5-RRC layer at Layer 2, while maintaining an upper layer context at the V2X layer; and
      send a first unicast link reconfiguration request, via a second PC5-RRC message transported via the PC5-RRC layer at Layer 2, to the second wireless communication device while maintaining the upper layer context at the V2X layer, the second PC5-RRC message including a first update to a sidelink-specific information element to reconfigure the unicast link.

9. The first wireless communication device of claim 8, wherein the one or more processors are further configured to:
receive, from the second wireless communication device, a response to the second PC5-RRC message, the response indicating an acceptance of the first unicast link reconfiguration request by the second wireless communication device; and
reconfigure the unicast link with the first update to the sidelink-specific information element.

10. The first wireless communication device of claim 8, wherein the one or more processors are further configured to:
receive, from the second wireless communication device, a response to the second PC5-RRC message indicating reasons for rejection of the first unicast link reconfiguration request by the second wireless communication device; and
adapt the first unicast link reconfiguration request to reconfigure the unicast link according to the indicated reasons.

11. The first wireless communication device of claim 8, wherein the one or more processors further configured to:
receive, from the second wireless communication device, a first response to the second PC5-RRC message including a second update to the sidelink-specific information element to reconfigure the unicast link, the second update to the sidelink-specific information element different from the first update to the sidelink-specific information element;
send, to the second wireless communication device, a second unicast link reconfiguration request including the second update to the sidelink-specific information element;
receive, from the second wireless communication device, a second response indicating an acceptance of the second unicast link reconfiguration request; and
reconfigure the unicast link with the second update to the sidelink-specific information element in response to receiving the second response.

12. The first wireless communication device of claim 8, wherein the one or more processors are further configured to:
receive, from the second wireless communication device, a response to the second PC5-RRC message including reasons of rejection of the first unicast link reconfiguration request and a backoff timer indicating an amount of time; and
postpone adapting a second unicast link reconfiguration request according to the reasons of rejection until the amount of time has elapsed.

13. The first wireless communication device of claim 8, wherein the one or more processors are further configured to:
receive a second unicast link reconfiguration request from the second wireless communication device; and
compare a first timestamp of the first unicast link reconfiguration request with a second timestamp of the second unicast link reconfiguration request.

14. The first wireless communication device of claim 13, wherein the one or more processors are further configured to:
accept the second unicast link reconfiguration request from the second wireless communication device and postpone reconfiguration of the unicast link based on the first unicast link reconfiguration request sent from the first wireless communication device in response to the second timestamp being earlier than the first timestamp; or
reject the second unicast link reconfiguration request from the second wireless communication device in response to the second timestamp being later than the first timestamp.

15. A first wireless communication device in a wireless communication network, comprising:
means for establishing a unicast link with a second wireless communication device by a V2X layer via a V2X layer message and a first PC5-Radio Resource Control (PC5-RRC) message transported via a PC5-RRC layer at Layer 2, while maintaining an upper layer context at the v2X layer; and
means for sending a first unicast link reconfiguration request via a second PC5-RRC message transported via the PC5-RRC layer at Layer 2, to the second wireless communication device while maintaining the upper layer context at the V2X layer, the second PC5-RRC message including a first update to a sidelink-specific information element to reconfigure the unicast link.

16. The first wireless communication device of claim 15, further comprising:
means for receiving, from the second wireless communication device, a response to the second PC5-RRC message, the response indicating an acceptance of the first unicast link reconfiguration request by the second wireless communication device; and
means for reconfiguring the unicast link with the first update to the sidelink-specific information element.

17. The first wireless communication device of claim 15, further comprising:
means for receiving, from the second wireless communication device, a response to the second PC5-RRC message indicating reasons for rejection of the first unicast link reconfiguration request by the second wireless communication device; and
means for adapting the first unicast link reconfiguration request to reconfigure the unicast link according to the indicated reasons.

18. The first wireless communication device of claim 15, further comprising:
means for receiving, from the second wireless communication device, a first response to the second PC5-RRC message including a second update to the sidelink-specific information element to reconfigure the unicast link, the second update to the sidelink-specific information element different from the first update to the sidelink-specific information element;
means for sending, to the second wireless communication device, a second unicast link reconfiguration request including the second update to the sidelink-specific information element;
means for receiving, from the second wireless communication device, a second response indicating an acceptance of the second unicast link reconfiguration request; and
means for reconfiguring the unicast link with the second update to the sidelink-specific information element in response to receiving the second response.

19. The first wireless communication device of claim 15, further comprising:
means for receiving, from the second wireless communication device, a response to the second PC5-RRC message including reasons of rejection of the first unicast link reconfiguration request and a backoff timer indicating an amount of time; and means for postponing adapting a second unicast link reconfiguration request according to the reasons of rejection until the amount of time has elapsed.

20. The first wireless communication device of claim 15, further comprising:

means for receiving a second unicast link reconfiguration request from the second wireless communication device; and means for comparing a first timestamp of the first unicast link reconfiguration request with a second timestamp of the second unicast link reconfiguration request.

* * * * *